(12) United States Patent
White

(10) Patent No.: US 9,572,330 B2
(45) Date of Patent: Feb. 21, 2017

(54) SHEEPSHEAD FISH HOOK

(76) Inventor: Derek J. White, Pooler, GA (US)

( * ) Notice: Subject to any disclaimer, the term of this patent is extended or adjusted under 35 U.S.C. 154(b) by 466 days.

(21) Appl. No.: 13/432,005

(22) Filed: Mar. 28, 2012

(65) Prior Publication Data

US 2013/0255133 A1    Oct. 3, 2013

(51) Int. Cl.
*A01K 83/02* (2006.01)
*A01K 83/00* (2006.01)

(52) U.S. Cl.
CPC ............ *A01K 83/00* (2013.01); *A01K 83/02* (2013.01)

(58) Field of Classification Search
CPC ......... A01K 83/02; A01K 83/00; A01K 83/06
USPC ............... 43/34–37, 43.16, 43.2, 43.4, 43.6, 44.82, 43/44.8
See application file for complete search history.

(56) References Cited

U.S. PATENT DOCUMENTS

| | | | | |
|---|---|---|---|---|
| 666,309 A | * | 1/1901 | Fiege | A01K 83/00 43/44.82 |
| 1,249,342 A | * | 12/1917 | Dahl | A01K 83/06 43/44.8 |
| 2,220,559 A | * | 11/1940 | Voigt | 43/34 |
| 2,244,271 A | * | 6/1941 | Voigt | 43/34 |
| 2,532,186 A | * | 11/1950 | Nolan | 43/89 |
| 5,425,195 A | | 6/1995 | Nakamichi | |
| 5,875,584 A | | 3/1999 | Gowing | |
| 5,901,493 A | * | 5/1999 | Tolliver | A01K 83/00 43/43.16 |
| 5,941,014 A | * | 8/1999 | Battaglia | 43/44.82 |
| 6,282,831 B1 | * | 9/2001 | Hugunin et al. | 43/4.5 |
| D654,555 S | * | 2/2012 | Rogers | D22/144 |

* cited by examiner

*Primary Examiner* — Thien Thanh Pham
(74) *Attorney, Agent, or Firm* — Hill, Kertscher & Wharton LLP; Gregory T. Ourada

(57) ABSTRACT

A fish hook with at least four barbs specially configured to neutralize the strike of the sheepshead fish, and increase the strike/catch ratio, is described herein.

3 Claims, 1 Drawing Sheet

SHEEPSHEAD FISH HOOK

BACKGROUND OF THE INVENTION

The sheepshead fish is an edible fish found primarily in mid-Atlantic to southern waters. It feeds primarily on bivalves (e.g. oysters, clams) and crustaceans (e.g. barnacles and fiddler crabs), having a mouth specially suited to crushing hard-shelled prey. There are two key problems faced by fisherman trying to catch sheepshead fish. First, it is often difficult to find a hook that will accommodate the live bait preferred by sheepshead fisherman, namely, fiddler crabs.

Second, sheepshead fishes are notorious bait stealers. The sheepshead fish, unlike other fish, does not attempt to eat the entire bait in one gulp. Rather, the sheepshead fish bites the crustacean to expose its contents, and then sucks out the contents without consuming the shell. Thus, the sheepshead fish is such an effective bait stealer because it rarely bites the single barb upon which the bait is affixed.

The requirement to hold live crustacean bait, as well as the speed and precision of the sheepshead's strike call for a hook that is not currently found in the prior art. Also, there is a need for a special hook to address the bony structure and teeth in the sheepshead's mouth.

BRIEF SUMMARY OF THE INVENTION

The fishhook described herein is designed to address all of these issues. Unlike conventional four-barb hooks, which usually feature barbs distributed 360 degrees around the shank (as viewed from above), the current design features barbs distributed around 180 degrees. Specifically, the preferred embodiment features four barbs, with two barbs in each of two perpendicular planes intersecting along the line of the shank. A first pair of barbs are disposed on opposite sides of the shank, while a second pair is disposed on the same side of the shank, with the barbs in the second pair having different radii of curvature so that one barb (to which the live bait, usually fiddler crab, is affixed) is nearer the shank. Regardless of the angle or the direction of the sheepshead's strike on the bait, this hook decreases the number of fish lost. The configuration of the barbs neutralizes the nature of the sheepshead's strike and the angle and direction of the fish's strike.

DETAILED DESCRIPTION OF THE INVENTION

Figure 1:
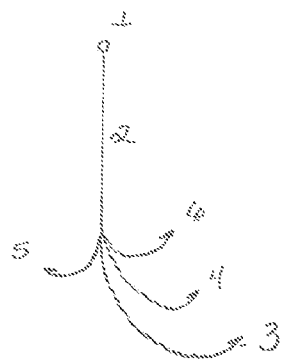
FIG. 1 is an isometric view of the hook.
Figure 2:
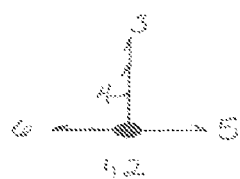
FIG. 2 is a top view of the hook design.
Figure 3:
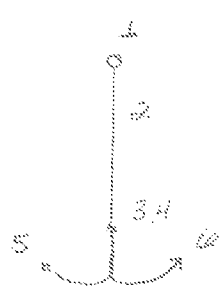
FIG. 3 is a front view of the hook
Figure 4:
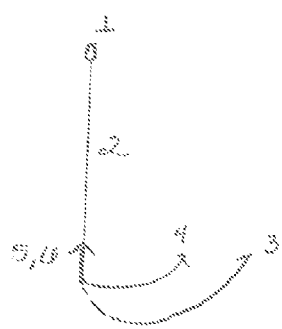
FIG. 4 is a right side view of the hook.
Figure 5:
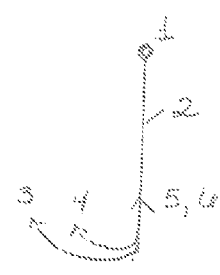
FIG. 5 is a left side view of the hook.

FIG. 1 is an isometric view of the overall configuration of the preferred embodiment of the hook specially designed to catch sheepshead fish. Like other prior art hooks, the sheepshead hook features an eye 1, allowing fishing line to be attached to the hook, and a shank 2, as well as four barbs. However, the configuration of the barbs in two perpendicular planes intersecting along the line of the shank is uniquely designed to neutralize the unique nature, angle, and direction of the sheepshead's strike and thereby increase the strike/catch ratio and reduce the amount of bait "stolen" by the sheepshead. As shown in FIGS. 1 through 5, two of the barbs 3 and 4 lie in one plane and both are on the same side of the shank, i.e. viewed from above, the lateral angle between the two barbs is zero degrees. Barbs 5 and 6 are both located in a second plane that is perpendicular to the plane containing barbs 3 and 4. The lateral angle between the other two barbs 5 and 6 is 180 degress, that is, they are located on opposite sides of the shank.

In this embodiment, the live bait (e.g. fiddler crabs) is affixed to barb 4. The hook is made from any suitable material known to the art, e.g. stainless steel.

With the barbs configured as described above, the bait is surrounded by barbs. The sheesphead fish must bite on at least one hook regardless of the approach of its bite. On three sides, there is a hook; and, the fourth side is blocked by the shank.

What is claimed is:

1. A fish hook specially adapted for use with sheepshead fish, comprising:
   a shank;
   a first set and a second set of curved elongated members, each of said curved elongated members originating from said shank at a same point, and terminating in a barb,
   wherein, each of said first set and said second set of curved elongated members lie entirely within, and thereby define a first plane and a second plane, respectively;
   wherein at least one curved elongated member in said first set of curved elongated members is disposed on an opposite side of said shank from a second curved elongated member in said first set of curved elongated members in said first plane;
   wherein all said curved elongated members in said second set of curved elongated members are disposed in a plane on a same side of said shank, and said barbs of said curved elongated members in said second set are disposed at different distances from said shank; and
   wherein said first and said second planes are perpendicular to each other with a line of intersection of said planes defined by said shank.

2. The fishhook of claim 1, wherein the barbs of said second set of curved elongated members point in substantially the same direction.

3. The fishhook of claim 1, wherein said second set of curved elongated members is comprised of exactly two elongated curved members.

* * * * *